United States Patent
Terao

(10) Patent No.: US 6,529,382 B2
(45) Date of Patent: *Mar. 4, 2003

(54) ELECTRONIC COMPUTER WITH A FILE BAY COVER INCLUDING AN ELECTRONIC LOCK AND METHOD OF CONTROLLING THE SAME

(75) Inventor: Masayuki Terao, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,193

(22) Filed: Dec. 23, 1999

(65) Prior Publication Data

US 2002/0075657 A1 Jun. 20, 2002

(30) Foreign Application Priority Data

Dec. 25, 1998 (JP) ............................................. 10-371079

(51) Int. Cl.$^7$ ................................................. G06F 1/16
(52) U.S. Cl. ....................... 361/726; 361/686; 361/727; 312/223.1; 340/825.31
(58) Field of Search ................................. 361/678, 679, 361/683–687, 724–727; 312/223.1–223.3, 324, 219; 340/895.31, 825.34, 310.08, 825.26, 825.3, 521; 16/230, 232, 231, 229; 49/193, 382; 292/5, 34, 8; 364/708.1; 360/903; 70/263, 277, 278, 266

(56) References Cited

U.S. PATENT DOCUMENTS

| | | | | |
|---|---|---|---|---|
| 4,727,369 A | * | 2/1988 | Rode et al. | 340/825.31 |
| 5,094,093 A | * | 3/1992 | Ben-Asher | 70/278 |
| 5,204,663 A | * | 4/1993 | Lee | 340/825.34 |
| 5,351,176 A | * | 9/1994 | Stephen et al. | 361/681 |
| 5,479,341 A | * | 12/1995 | Pihl et al. | 364/184 |
| 5,523,746 A | * | 6/1996 | Gallagher | 340/825.31 |
| 5,542,044 A | * | 7/1996 | Pope | 395/186 |
| 5,552,776 A | * | 9/1996 | Wade et al. | 340/825.31 |
| 5,648,762 A | | 7/1997 | Ichimura et al. | |
| 5,717,570 A | * | 2/1998 | Kikinis | 361/685 |
| 5,774,058 A | * | 6/1998 | Henry et al. | 340/825.31 |
| 5,774,059 A | * | 6/1998 | Henry et al. | 340/825.31 |
| 5,781,408 A | * | 7/1998 | Crane et al. | 361/683 |
| 5,816,672 A | * | 10/1998 | LaPointe et al. | 312/223.2 |
| 5,841,631 A | * | 11/1998 | Shin et al. | 361/684 |
| 5,877,938 A | * | 3/1999 | Hobbs et al. | 361/724 |
| 5,926,916 A | * | 7/1999 | Lee et al. | 16/230 |
| 6,032,858 A | * | 3/2000 | Yazumi et al. | 235/379 |
| 6,049,287 A | * | 4/2000 | Yulkowski | 340/693.12 |
| 6,064,568 A | * | 5/2000 | Schmitt | 361/685 |
| 6,163,431 A | * | 12/2000 | Fleckenstein et al. | 360/92 |

FOREIGN PATENT DOCUMENTS

| | | |
|---|---|---|
| JP | 1-58982 | 4/1989 |
| JP | 4-327666 | 11/1992 |
| JP | 5-5375 | 1/1993 |
| JP | 5-80882 A | 4/1993 |
| JP | 6-89383 A | 3/1994 |
| JP | 7-219666 A | 8/1995 |
| JP | 8-2791 A | 1/1996 |
| JP | 3034254 | 11/1996 |
| JP | 9-30613 | 2/1997 |
| JP | 9-73492 | 3/1997 |
| JP | 9-91060 A | 4/1997 |
| JP | 9-138714 A | 5/1997 |
| JP | 2741726 | 1/1998 |

\* cited by examiner

*Primary Examiner*—Darren Schuberg
*Assistant Examiner*—Michael Datskovsky
(74) *Attorney, Agent, or Firm*—Foley & Lardner

(57) ABSTRACT

An electronic computer with a file bay cover includes an electronic lock unit for selectively opening and closing the file bay cover and a sensor responsive to the locked state of the lock. The electronic lock unit is controlled by electronic control. The computer enhances the efficiency of a centralized control system and security.

25 Claims, 2 Drawing Sheets

Figure 1:
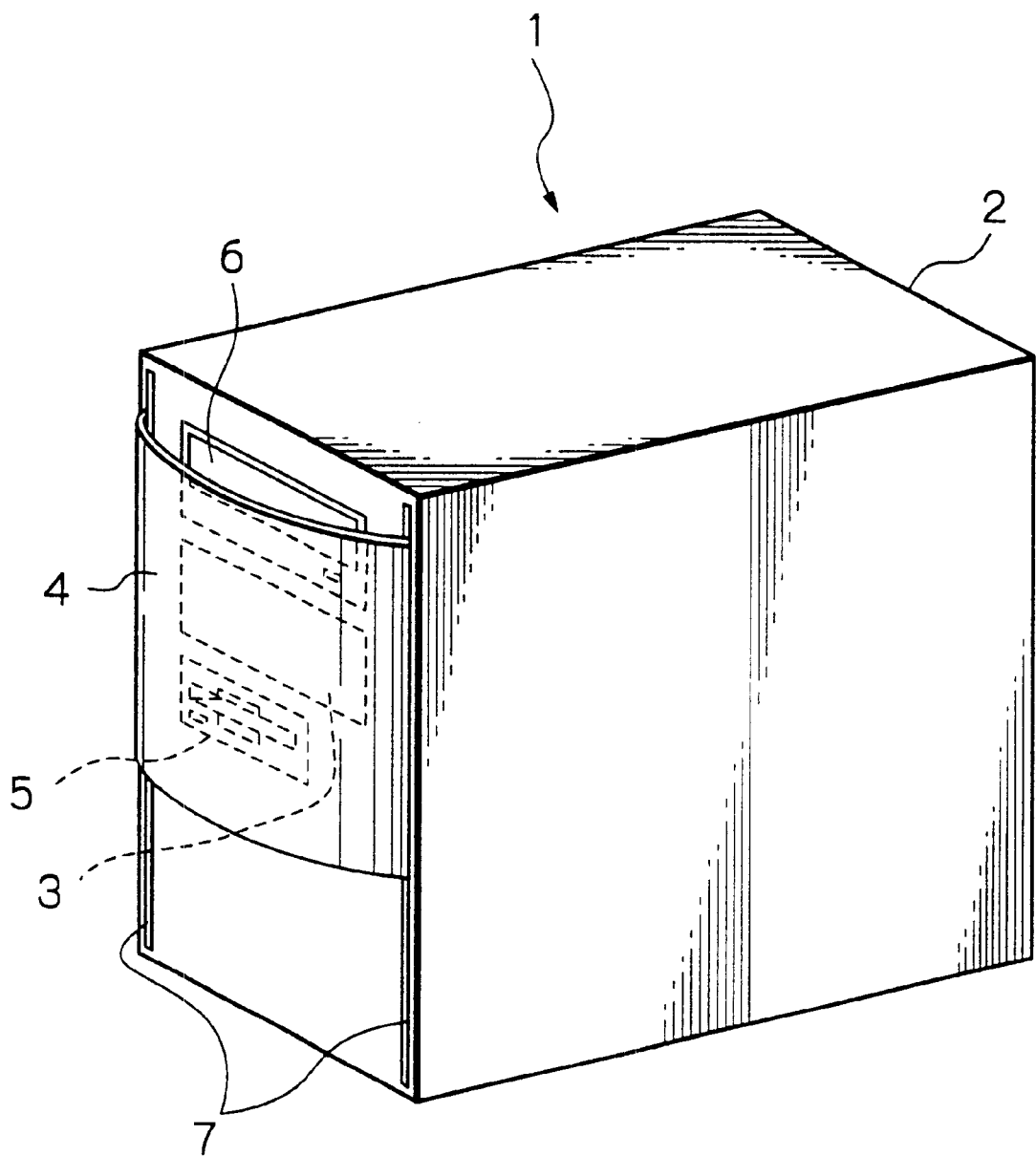

ELECTRONIC COMPUTER WITH A FILE BAY COVER INCLUDING AN ELECTRONIC LOCK AND METHOD OF CONTROLLING THE SAME

BACKGROUND OF THE INVENTION

The present invention relates to an electronic computer with a file bay cover including an electronic lock and a method of controlling the same.

The spread of electronic computers has recently derived even personal computers owned by individual persons and has accelerated the development of general software. Today, a variety of operating systems (OSs) and other software for promoting easy installation of the general software in computers are available. Easy installation, however, is apt to render a computer system unstable due to operator's careless installation work. In fact, careless installation often affects the OS software and other general software loaded in a computer.

In a personal computer, for example, careless installation is likely to overwrite or destroy other general software loaded in the computer. Also, in a network environment implemented by, e.g., the Internet, when the computer system of a provider or similar enterprise collectively managing an information network becomes unstable, it is apt to damage existing customers in the network environment.

Moreover, the prerequisite with a computer possibly used by a plurality of persons in an enterprise is that confidential information be prevented from leaking to the outside in the form of a floppy disk (FD) or similar removable medium. To meet this requirement, there is an increasing demand for a computer capable of rendering temporarily unusable a CD-ROM drive, FD drive or similar drive unit dealing with removable media, i.e., capable of implementing a collective security system.

In light of the above, it is a common practice with an electronic computer to cover a file bay, i.e., a space for accommodating a CD-ROM drive, an FD drive and other drive units with a cover or file bay cover including a lock. The file bay cover is mounted on the computer in such a manner as to cover the drive units including the CD-ROM drive and FD drive. However, the conventional file bay cover with a lock is implemented by a physical lock. As a result, in an enterprise, for example, in which hundreds of computers are operated daily, a great number of locks are required, complicating the management of file bays.

To render the CD-ROM drive and FD drive unusable, a password for entering a BIOS (Basic Input/Output System) setup menu and replacing the conventional physical lock may be input on the computer, as also proposed in the past. However, locking relying on a password practically invalidates the function of the FD drive and limits even the reading operation of the FD drive. In addition, the CD-ROM drive and FD drive cannot be rendered usable or unusable unless the entire function of the computer is shut down for a moment.

Technologies relating to the present invention are disclosed in, e.g., Japanese Patent Laid-Open Publication Nos. 4-327666, 5-5375, 9-30613 and 9-73492 as well as in Japanese Patent No. 2, 741, 726.

SUMMARY OF THE INVENTION

It is therefore an object of the present invention to provide an electronic computer with a file bay cover including an electronic lock, which is capable of enhancing the efficiency of a centralized management and security system.

Figure 2A:
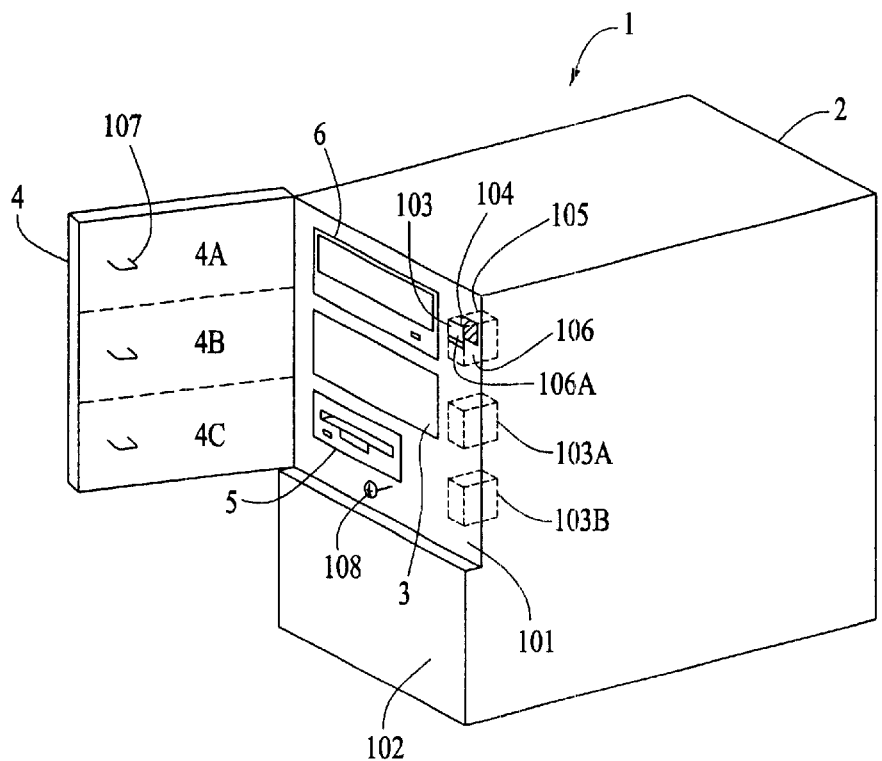
Figure 2B:
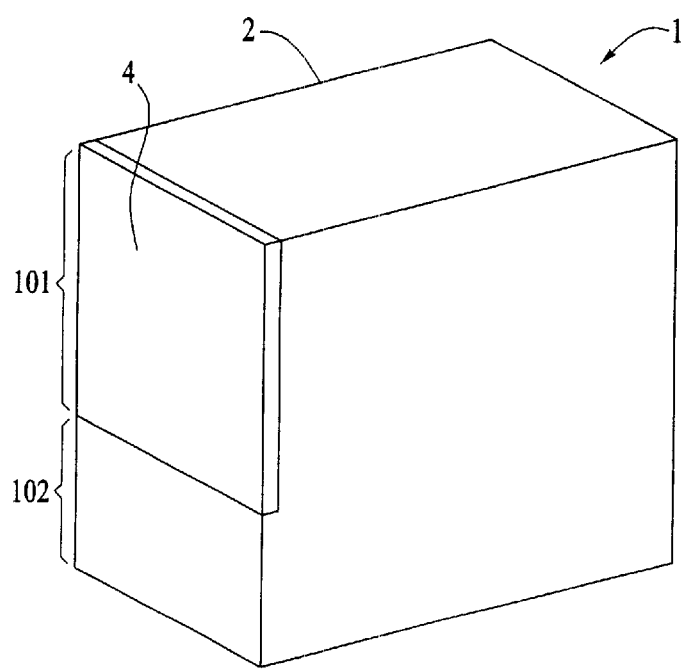

An electronic computer of the present invention includes a file bay cover for covering a file bay accommodating a drive unit that deals with a removable medium, and includes a lock for selectively locking or unlocking the file bay cover and a sensor responsive to closing of the file bay cover. The lock is opened by electronic control. BRIEF DESCRIPTION OF THE DRAWING The above and other objects, features and advantages of the present invention will become more apparent from the following detailed description taken with the accompanying drawings in which:

FIG. 1 is an isometric view showing a conventional electronic computer with a file bay cover; and FIGS. 2A and 2B are isometric views showing an electronic-computer with a file bay cover including an electronic lock embodying the present invention.

DESCRIPTION OF THE PREFERRED EMBODIMENT

To better understand the present invention, brief reference will be made to a conventional electronic computer with a file bay cover including a lock, shown in FIG. 1. As shown, the computer includes a body 1 on which a CD-ROM drive 6 and an FD drive 5 are mounted. A file bay cover 4 is also mounted on the body 1 in such a manner as to cover the CD-ROM drive 6 and FD drive 5. Specifically, the file bay cover 4 has its opposite edges received in rails or channels 7 formed in opposite side edges of the front of a casing 2. The file bay cover 4 prevents a person from loading or unloading the CD-ROM drive 6 or the FD drive 5 with a CD-ROM or a floppy disk, respectively, unless the person slides the cover 4 upward or downward along the rails 7. This is successful to obviate careless operation.

In the above configuration, although the recording media cannot be taken in or taken out, a particular CD-ROM can be used as a data base. As for the FD drive 5, too, while the replacement of the recording medium is limited, a recording medium existing in the drive 5 can be used to read or write data via a keyboard.

However, the above conventional computer with a file bay cover has some problems left unsolved, as discussed earlier.

Referring to FIGS. 2A and 2B, an electronic computer with a file bay cover including an electronic lock embodying the present invention will be described. As shown in FIG. 2A, the computer includes a body 1 having a casing 2. The front end of the casing 2 is divided into an upper part 101 and a lower part 102. Switches including a power switch, not shown, are arranged on the lower part 102 while a file bay or space 3 is formed on the upper part 101. The file bay 3 is capable of accommodating three different drive units each dealing with a particular recording medium. In the illustrative embodiment, the file bay 3 is loaded with a CD-ROM drive 6 and an FD drive 5 that are specific forms of the drive units. A file bay cover 4 is hinged to one side of the upper part 101. The rear of the file bay cover 4 is capable of contacting the front end of the upper part 101 while covering the file bay 3. When the rear of the file bay cover 4 contacts the front end of the upper part 101, the front of the cover 4 is flush with the lower part 102.

A generally U-shaped latch 107 is positioned on the rear of the file bay cover 4. When the cover 4 is closed, the latch 107 mates with a recess 103 formed in the front end of the upper part 101. An electronic lock unit 105 is buried in the recess 103 and made up of a sensor 104 and a solenoid 106. When the cover 4 is closed to cause the latch 107 to mate with the recess 103, the end of the latch 107 abuts against the sensor 104. In response, the sensor 104 determines that the cover 4 is ready to be locked. The solenoid 106 is positioned in the lower portion of the recess 103 and electrically connected to circuitry arranged in the body 1. The solenoid 106 includes a plunger 106a capable of protruding into the recess 103.

In operation, assume that a person closes the file bay cover 4 from a position shown in FIG. 2A to a position shown in FIG. 2B. Then, the end of the latch 107 abuts against the sensor 104. The sensor 104 therefore determines that the cover 4 is ready to be locked. In response to the resulting output of the sensor 104, the plunger 106a of the solenoid 106 is caused to protrude into the recess 103 and lock the cover 4. In this condition, although a CD-ROM or a floppy disk cannot be taken out of the file bay 3, a CD-ROM, if existing in the CD-ROM drive 6, can be used to read or write data. It is therefore possible to secure, e.g., confidential data to be read only in the form of a CD-ROM and to perform usual work with the CD-ROM in the locked state. This is also true with a floppy disk existing in the FD drive 5.

To unlock the file bay cover 4, the solenoid 106 is operated to retract its plunger 106a and thereby release the latch 107 from the recess 103. This operation of the solenoid 106 is based on the authentication using, e.g., a password, a smart card or a fingerprint by way of example. This kind of authentication is much simpler than authentication using physical locks equal in number to electronic computers.

With a single smart card, for example, a person is capable of managing all computers authorized to operate. In a network environment, information relating to a password, a smart card or a fingerprint may be sent to an authentication server connected to the network, in which case the file bay cover 4 will not be unlocked if the server does not authenticate the above information. If desired, the authentication server may record the operation history of the lock for the centralized control of the registration of the password, smart card or fingerprint, so that easy management and security can be promoted. In addition, such an authentication server is allowed to operate the lock at a remote station and therefore manage it more easily. Further, the above authentication may be applied only to the opening of the cover 4.

To further enhance security, a screw 108 for supporting the casing 2 may be provided in the upper part 101 such that the casing 2 is prevented from being opened at the same time as the file bay 3 is locked.

In summary, it will be seen that the present invention provides an electronic computer with a file bay cover including an electronic lock and having various unprecedented advantages, as enumerated below.

(1) A lock in the form of, e.g., a password, a smart card or a fingerprint is usable for authentication. This successfully enhances security while preserving the advantage that a CD-ROM drive or an FD drive, for example, can be locked or unlocked by a file bay cover even when the computer is in operation.

(2) In a network environment, information relating to the password, smart card or fingerprint may be sent to an authentication server connected to the network, in which case the file bay cover will not be unlocked if the server does not authenticate the above information. Further, the authentication server may record the operation history of the lock for the centralized control of the registration of the password, smart card or fingerprint, so that easy management and security can be promoted.

(3) Such an authentication server is allowed to operate the lock at a remote station. Even if a computer to be locked is located at a remote station or when time available is short, the file bay of the computer can be control led via a computer connected to the network. This is successful to save time.

(4) To further enhance security, a screw (108) for supporting the casing of the computer may be provided in the file bay such that the casing is prevented from being opened at the same time as the file bay is locked. Thus, as long as the file bay is locked, the casing is prevented from being disassembled. This further promotes security.

(5) A particular file bay cover may be assigned to each recording medium and selectively locked. Also, file management can be effected medium by medium.

(6) When the file bay cover is locked via, e.g., a keyboard, easy locking directly related to the operation of the computer is realized. This makes it necessary for the operator to perform the operation of the lock and that of the computer one by one.

(7) All file bay covers can be collectively locked or unlocked by electronic control in order to reduce the users' loads.

(8) It is not necessary for a particular user to carry or manage a physical lock. In addition, the electronic control over at least the locking operation is desirable from the security standpoint.

(9) Only a manager or a person in charge of the computer can deal with the recording media, so that security is further promoted.

Various modifications will become possible for those skilled in the art after receiving the teachings of the present disclosure without departing from the scope thereof.

What is claimed is:

1. An electronic computer including a file bay cover for covering a file bay accommodating a drive unit associated with a removable medium, said electronic computer comprising:

a lock for selectively locking and unlocking said file bay cover; and a sensor responsive to manual closing of said file bay cover for locking said lock;

said lock being opened by electronic control.

2. A computer as claimed in claim 1, wherein said file bay cover is opened and closed by electronic control.

3. A computer as claimed in claim 2, wherein said lock is controlled by an input to said electronic computer.

4. A computer as claimed in claim 3, wherein said file bay cover comprises a plurality of file bay covers each assigned to a particular drive unit.

5. A computer as claimed in claim 3, wherein said file bay includes a screw for affixing a casing of said computer.

6. A computer as claimed in claim 2, wherein said file bay cover comprises a plurality of file bay covers each being assigned to a particular drive unit.

7. A computer as claimed in claim 2, wherein said file bay includes a screw for affixing a casing of said computer.

8. A computer as claimed in claim 1, wherein said lock is controlled by an input to said electronic computer.

9. A computer as claimed in claim 8, wherein said file bay cover comprises a plurality of file bay covers each being assigned to a particular drive unit.

10. A computer as claimed in claim 8, wherein said file bay includes a screw for affixing a casing of said computer.

11. A computer as claimed in claim 1, wherein said file bay cover comprises a plurality of file bay covers each being assigned to a particular drive unit.

12. A computer as claimed in claim 11, wherein said file bay includes a screw for affixing a casing of said computer.

13. A computer as claimed in claim 1, wherein said file bay includes a screw for affixing a casing of said computer.

14. In an electronic computer with a file bay cover having an electronic locking function, a lock configured to latch upon manual closing of said file bay cover to prevent access to a drive unit associated with a removable medium, said lock controlled for unlocking by an input to said electronic computer.

15. A computer as claimed in claim 14, wherein said lock is controlled by authenticating means included in an authentication server in a network environment.

16. A computer as claimed in claim 15, wherein an operation history of said lock is recorded.

17. A computer as claimed in claim 15, wherein said authenticating means controls said lock on the basis of one of a password, a smart card and a fingerprint.

18. A computer as claimed in claim 17, wherein an operation history of said lock is recorded.

19. An apparatus comprising:
   a computer having a file bay and at least one file bay cover;
   a lock configured to lock and unlock said file bay cover, said lock configured to unlock under electronic control of said computer; and
   a sensor responsive to manual closing of said file bay cover, said sensor configured to cause said lock to lock upon manual closing of said cover.

20. The apparatus of claim 19, wherein said file bay cover comprises a latch, and wherein said lock comprises:
   a plunger configured to engage said latch; and
   a solenoid coupled to said plunger.

21. The apparatus of claim 19, wherein said computer comprises a casing and said file bay comprises a screw for affixing said casing, whereby locking of said file bay cover prevents access to said screw for removal of said casing.

22. The apparatus of claim 19, further comprising:
   a second file bay cover; and
   a second lock associated with said second file bay cover.

23. The apparatus of claim 19, further comprising an access server coupled to said computer, said access server configured to:
   receive a file bay access request from said computer;
   authenticate said file bay access request; and
   transmit an access authentication response to said computer for enabling said computer to electronically control the unlocking of said lock.

24. The apparatus of claim 23, wherein said file bay access request comprises information from at least one of a smart card, a password and a fingerprint.

25. The apparatus of claim 23, wherein said access server is further configured to maintain a history of operation of said lock.

* * * * *